(12) United States Patent
Beck et al.

(10) Patent No.: US 9,199,522 B2
(45) Date of Patent: Dec. 1, 2015

(54) AXLE AND PRODUCTION METHOD THEREOF

(75) Inventors: Gerhard Beck, Jettingen-Scheppach (DE); Wolfgang Hildensperger, Jettingen-Scheppach (DE); Robert Köhler, Waltenhausen (DE); Georg Schuster, Burtenbach/OT Kemnat (DE); Stefan Uhl, Günzburg (DE); Peter Wegscheider, Kötz-Großkötz (DE)

(73) Assignee: ALOIS KOBER GmbH, Kötz (DE)

( * ) Notice: Subject to any disclaimer, the term of this patent is extended or adjusted under 35 U.S.C. 154(b) by 0 days.

(21) Appl. No.: 14/131,234

(22) PCT Filed: Jul. 6, 2012

(86) PCT No.: PCT/EP2012/063226
§ 371 (c)(1),
(2), (4) Date: Jan. 7, 2014

(87) PCT Pub. No.: WO2013/007626
PCT Pub. Date: Jan. 17, 2013

(65) Prior Publication Data
US 2014/0138930 A1    May 22, 2014

(30) Foreign Application Priority Data
Jul. 8, 2011  (DE) ............. 20 2011 103 222 U (51) Int. Cl.
*B60G 7/00* (2006.01)
*B60G 11/18* (2006.01)
(Continued)

(52) U.S. Cl.
CPC ............. *B60G 11/00* (2013.01); *B60G 7/001* (2013.01); *B60G 11/183* (2013.01); *B60G 11/225* (2013.01); *B60G 2202/142* (2013.01); *B60G 2206/10* (2013.01); *B60G 2206/8103* (2013.01)

(58) Field of Classification Search
CPC ............. B60G 3/02; B60G 3/12; B60G 3/14; B60G 3/145; B60G 11/183; B60G 2206/10; B60G 2206/20; B60G 2206/201; B60G 2206/203; B60G 2206/8102; B60G 2206/8103; B60G 2206/8108; B60G 2206/8109; B60G 7/001; B60G 21/05; B60G 21/051; B60G 21/052; B60G 21/053; B60G 11/18
USPC ................ 280/679, 684, 124.125, 124.13, 280/124.131, 124.133; 74/607
See application file for complete search history.

(56) References Cited

U.S. PATENT DOCUMENTS 2,662,236 A * 12/1953 Kester ............... 114/344
2,925,264 A *  2/1960 Loehr ............... 267/284
(Continued)

FOREIGN PATENT DOCUMENTS

DE    11 89 392 B    3/1965
DE    1 580 533 A1   6/1970
(Continued)

*Primary Examiner* — Ruth Ilan
*Assistant Examiner* — Barry Gooden, Jr.
(74) *Attorney, Agent, or Firm* — McGlew and Tuttle, P.C.

(57) ABSTRACT

A carrying axle (1) for trailers and a method for the production thereof are provided. The axle (1) includes an axle body (4) having an outer supporting axle tube (10) in which a rocker arm assembly (6), which is bent once or several times, is introduced. The rocker arm assembly (6) is produced as a metal, tubular stamped and bent single piece. The rocker arm assembly is stamped from a platine (21) or a sheet metal strip (23) and is bent in order to form an angled tube (22).

24 Claims, 10 Drawing Sheets (51) Int. Cl.
*B60G 11/00* (2006.01)
*B60G 11/22* (2006.01)

(56) References Cited

U.S. PATENT DOCUMENTS

| | | | | |
|---|---|---|---|---|
| 3,005,642 | A | * | 10/1961 | Hertel .................... 280/124.165 |
| 3,071,366 | A | * | 1/1963 | Loehr ........................... 267/284 |
| 3,342,505 | A | * | 9/1967 | Diehl ........................ 280/43.18 |
| 3,436,069 | A | * | 4/1969 | Henschen ................... 267/279 |
| 3,687,479 | A | * | 8/1972 | Kober ..................... 280/124.13 |
| 3,778,082 | A | * | 12/1973 | Grosseau ................ 280/124.13 |
| RE28,259 | E | * | 12/1974 | Henschen ................... 267/279 |
| 4,230,252 | A | | 10/1980 | Meyer et al. |
| 4,243,247 | A | * | 1/1981 | Kataoka .................... 280/6.157 |
| 4,723,790 | A | * | 2/1988 | Wharton ................. 280/124.13 |
| 5,163,701 | A | * | 11/1992 | Cromley, Jr. ............. 280/124.13 |
| 5,277,450 | A | * | 1/1994 | Henschen ................. 280/6.151 |
| 5,324,073 | A | * | 6/1994 | Alatalo et al. ......... 280/124.116 |
| 5,641,176 | A | * | 6/1997 | Alatalo .................... 280/124.13 |
| 6,059,314 | A | * | 5/2000 | Streubel et al. ............... 280/798 |
| 6,152,468 | A | * | 11/2000 | Glaser et al. ............ 280/124.134 |
| 6,357,770 | B1 | * | 3/2002 | Carpiaux et al. ....... 280/124.127 |
| 6,588,778 | B1 | * | 7/2003 | McLaughlin ............ 280/124.13 |
| 7,284,765 | B1 | * | 10/2007 | Inoue et al. ............ 280/124.166 |
| 8,191,911 | B1 | * | 6/2012 | Reynolds .............. 280/124.166 |
| 8,573,621 | B1 | * | 11/2013 | Reynolds .............. 280/124.166 |
| 8,657,316 | B1 | * | 2/2014 | Bowers et al. ......... 280/124.156 |
| 8,757,650 | B2 | * | 6/2014 | Revelino et al. ....... 280/124.169 |
| 2003/0141757 | A1 | * | 7/2003 | Deletombe .................... 301/127 |
| 2005/0035567 | A1 | * | 2/2005 | Ok et al. ................. 280/124.107 |
| 2005/0127632 | A1 | * | 6/2005 | Gehret .................... 280/124.13 |
| 2006/0033303 | A1 | * | 2/2006 | Shin ........................ 280/124.128 |
| 2006/0201087 | A1 | * | 9/2006 | Cutforth .......................... 52/296 |
| 2007/0102210 | A1 | * | 5/2007 | Oshidari ...................... 180/65.5 |
| 2007/0290474 | A1 | * | 12/2007 | Inoue et al. ............ 280/124.166 |
| 2008/0150249 | A1 | * | 6/2008 | Murata .................. 280/124.128 |
| 2008/0203693 | A1 | * | 8/2008 | Yamada .................. 280/124.127 |
| 2008/0284118 | A1 | * | 11/2008 | Venton-Walters et al. 280/6.154 |
| 2009/0278329 | A1 | * | 11/2009 | Vandenberg et al. .... 280/124.13 |
| 2010/0019466 | A1 | * | 1/2010 | Lee ........................ 280/124.116 |
| 2010/0038893 | A1 | * | 2/2010 | Stolle et al. ...................... 280/781 |
| 2010/0059961 | A1 | * | 3/2010 | Kato et al. ............. 280/124.166 |
| 2010/0133774 | A1 | * | 6/2010 | Lee ........................ 280/124.116 |
| 2010/0259025 | A1 | * | 10/2010 | Holt et al. ............. 280/124.127 |
| 2011/0097598 | A1 | * | 4/2011 | McNutt et al. ................. 428/650 |
| 2011/0272910 | A1 | * | 11/2011 | Rezania et al. ........ 280/124.134 |
| 2011/0272912 | A1 | * | 11/2011 | Le Gourvellec ....... 280/124.135 |
| 2011/0290634 | A1 | * | 12/2011 | Del Corso et al. ............ 202/158 |
| 2014/0223743 | A1 | * | 8/2014 | Frehn et al. .................. 29/897.2 |

FOREIGN PATENT DOCUMENTS

| | | |
|---|---|---|
| DE | 195 33 479 A1 | 3/1997 |
| EP | 0 555 541 A1 | 8/1993 |
| FR | 2 753 930 A1 | 4/1998 |
| GB | 815 608 | 7/1959 |
| GB | 2 032 049 A | 4/1980 |

* cited by examiner

Fig. 20

AXLE AND PRODUCTION METHOD THEREOF

CROSS REFERENCE TO RELATED APPLICATIONS

This application is a United States National Phase Application of International Application PCT/EP2012/063226 filed Jul. 6, 2012 and claims the benefit of priority under 35 U.S.C. §119 of German Patent Application DE 20 2011 103 222.5 filed Jul. 8, 2011, the entire contents of which are incorporated herein by reference.

FIELD OF THE INVENTION

The present invention pertains to an axle and a method for production thereof, the axle being especially carrying axle, for vehicles, especially trailers, whereby the axle has an axle body with an outer supporting axle part, especially an outer axle tube, and an angular rocker arm assembly mounted therein.

BACKGROUND OF THE INVENTION

Such an axle is known from U.S. Pat. No. 6,588,778 B1. It is designed as a carrying axle for a trailer and has an axle body, an axle spring mounting and a rocker arm assembly. The rocker arm assembly has a one-piece design and consists of an inner axle tube and a rocker arm, which have different cross-sectional shapes and which are produced from a premanufactured one-piece tube by a hydroforming process. The inner axle tube plugs in an outer axle tube, which is connected to the trailer, whereby elastic cords are inserted between them for forming the axle spring mounting. An axle stub is inserted at the free end of the tube of the rocker arm, which is bent several times. The prior-art rocker arm assembly requires a high and costly construction effort.

FR 2 753 930 shows a similar rubber spring axle with a one-piece rocker arm assembly that consists of a premanufactured and bent tube with a circular cross section. This construction also has a high and costly construction effort, whereby the bending of premanufactured tubes with a closed jacket may also cause difficulties with the accuracy to size and strength.

SUMMARY OF THE INVENTION

The object of the present invention is to provide an improved axle, especially an improved rocker arm assembly in addition to the production method thereof.

According to the invention a carrying axle for vehicles and trailers is provided. The axle comprises an axle body comprising an outer supporting tubular axle part and an angular rocker arm assembly. The rocker arm assembly is mounted within the tubular axle part. The rocker arm assembly includes at least one bend. The rocker arm comprises a one-piece, tubular, stamped and bent part made of metal.

The design of the angular rocker arm assembly as a one-piece, tubular, stamped and bent part made of metal, especially made of sheet steel, has advantages in terms of the construction and cost effort. Moreover, a high production accuracy and accuracy to size can be achieved.

The shaping, in particular the cross-sectional geometry of the tubular rocker arm assembly, can be adapted to the requirements, especially with regard to strength and installation space. A prismatic, especially triangular cross section is advantageous here. Furthermore, the possibility of mounting one or more reinforcements on the rocker arm assembly in a specific manner as needed, especially in the bending or curvature area, is favorable. In particular, a bead-like widening of the cross section can be provided here.

Furthermore, the connection to an axle stub, which can be arranged transversely to the rocker arm and especially guided and fixed in a recess there, has a cost- and effort-reducing effect.

The claimed rocker arm assembly can be designed as a tube, which has been bent once or several times, with a closed cross section, whereby the abutting edge resulting during bending and running especially lengthwise, can be closed and fixed with a joint, especially a weld seam. Such a joint may also be present in the bending area. The production method also makes possible cost-effective shape variants of the rocker arm assembly for adaptation to different axles or vehicles.

The angular rocker arm assembly may be formed from a single sheet metal strip by stamping and bending. Functional shapings, e.g., indentations for spring elements, bead-like reinforcements, etc. can be created here by embossing in a simple and cost-effective manner in the process. The production method used is especially cost-effective and at the same time offers variation possibilities.

The rocker arm assembly can be dimensioned and coordinated in such a way that the rocker arm can be accommodated in the interior space of a rim. As a result, the wheel with the rim can be brought up close to the axle body and to the lateral vehicle edges. This makes possible a more narrow type of construction of the vehicle or, as an alternative, an enlargement of the useful width of the vehicle. Moreover, the rim interior space can enclose the rocker arm in a protective manner and shield same against external effects. Further advantages of the arrangement of the rocker arm in the rim are cost savings and a reduction in unsprung masses due to the lower rocker arm weight. Furthermore, the lateral distance between the bottom-side wheel contact surface and axle spring mounting, especially to their spring elements, is reduced. This results in an improved wheel toe and camber behavior. On the other hand, the torque load of the axle spring mounting resulting therefrom is reduced due to the shorter lateral distance, which makes it possible to use shorter and more cost-effective spring elements, especially elastic cords. This design of a rocker arm assembly has independent inventive importance and can also be combined in conjunction with other prior-art rocker arm assemblies.

The present invention is shown schematically and by way of example in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, The present invention pertains to an axle (1), especially a carrying axle, for vehicles, and especially trailers. The present invention also pertains to a rocker arm assembly (6) for such an axle and for the vehicle equipped with an axle (1). Moreover, the present invention pertains to a production method.

Figures 1, 2:
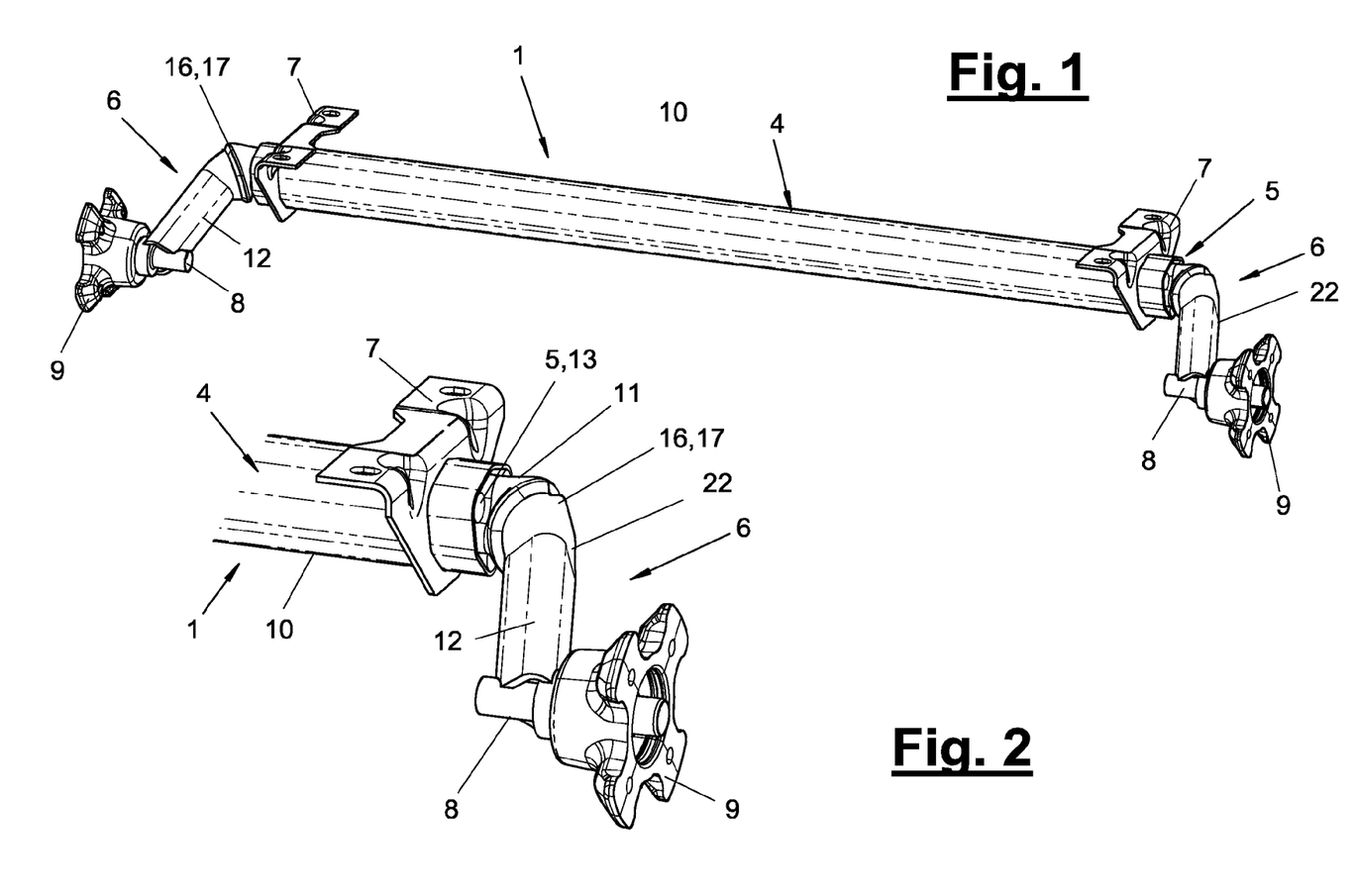
FIG. 1 is a perspective assembly of an axle with an axle body and two end-side rocker arm assemblies.
FIG. 2 is a broken and enlarged representation of a rocker arm assembly of FIG. 1.
Figure 3:
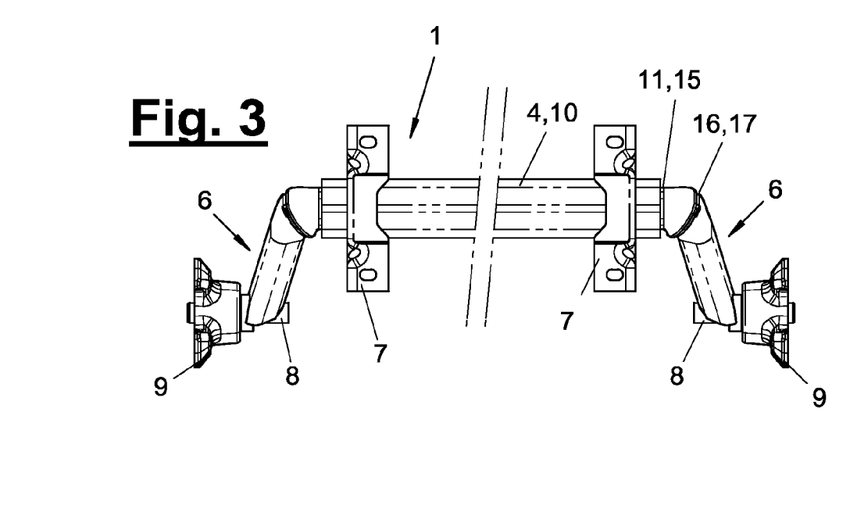
FIG. 3 is a top view of the axle of FIG. 1 in broken-off and abridged representation.
Figure 4:
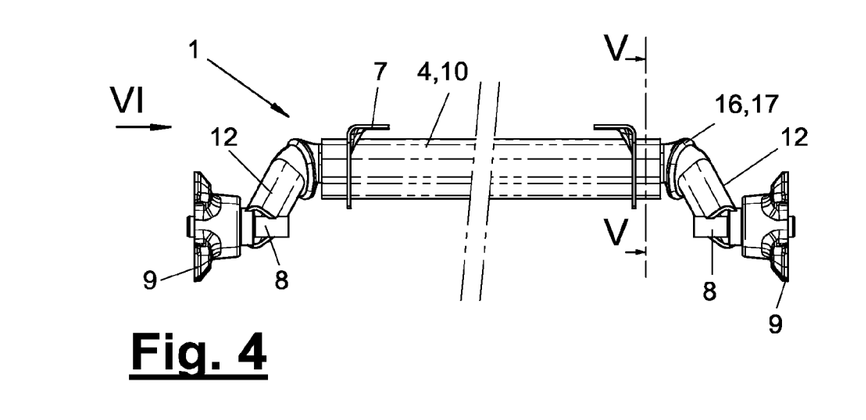
FIG. 4 is a front view of the axle of FIG. 1 in broken-off and abridged representation.

FIG. 1 shows such an axle (1), which is designed here, e.g., as an unbraked carrying axle, as an example. The axle (1) has an axle body (4) and a rocker arm assembly (6) mounted thereon, which has a hub (9) and the wheel (cf. FIGS. 15 through 18). The axle (1) also has a spring mounting (5) for the rocker arm assembly (6) and is designed, e.g., as a rubber spring axle.

In the embodiment shown, a rocker arm assembly (6) is located at both ends of the axle body (4). In a variant not shown, the axle (1) may be designed as a split axle, on the two shortened axle bodies (4) of which a rocker arm assembly is mounted only on one side in each case.

The axle body (4) has a supporting axle part (10) with a metal fitting (7) for fastening to a vehicle, especially to a trailer. The metal fitting (7) may be designed, e.g., as an angular mounting flange and be arranged at both ends of the axle body. It is used for fastening the axle body (4) to a chassis, and especially at side rails or at the bottom of a vehicle structure. The supporting axle part (10) is designed as just an outer axle tube, which has, e.g., a prismatic cross section, in the embodiment shown.

The spring mounting (5) is designed as an axle spring mounting, which is integrated in the axle part or outer axle tube (10), in the exemplary embodiment shown. As an alternative or in addition, the spring mounting (5) may be designed differently and consist, e.g., of external springs. These may be, for example, coil springs, leaf springs, but also air springs or the like.

A rocker arm assembly (6) is inserted into the outer axle tube (10) at one or at both open tube ends and mounted here. The mounting may be formed, e.g., via the axle spring mounting (5).

The rocker arm assembly (6) consists of an inner axle part (11) and a rocker arm (12) connecting transversely or diagonally thereto at the end. The inner axle part (11) protrudes into the outer axle tube (10) and is mounted here in a suitable manner, e.g., via the axle spring mounting (5). A lead-in bevel (29) on the front side of the axle part (11) facilitates the insertion into the axle tube (10).

Figure 5:
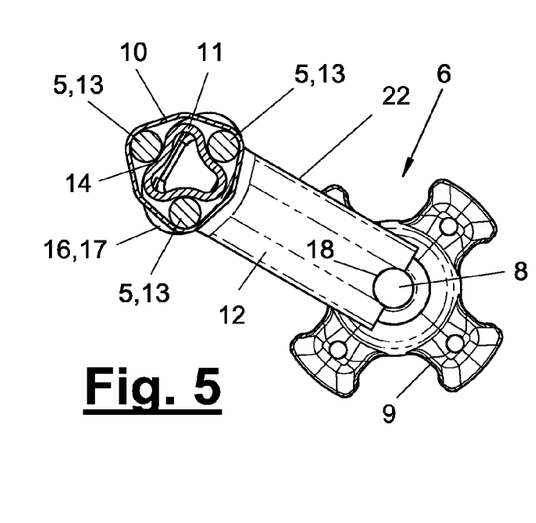
FIG. 5 is a sectional view through the axle according to intersecting line V-V of FIG. 4.
Figure 6:
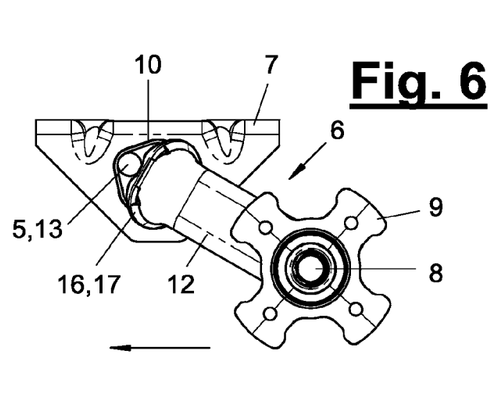
FIG. 6 is a tilted and enlarged side view of the axle according to arrow VI of FIG. 4.

As FIGS. 1 through 6 illustrate, the rocker arm assembly (6) is installed in such a rotary position in the axle tube (10) that, in the unloaded state, the respective rocker arm (12) protrudes diagonally downwards and hence is directed against the direction of travel marked with an arrow in FIG. 6 (towing position).

At the free end, rocker arm (12) has an axle stub (8), on which a wheel hub (9) is in turn rotatably mounted. The rim (3) of a wheel (2) can be fastened to the wheel hub (9). This assembly is shown in FIGS. 15 through 18 and is described in detail below.

The inner axle part (11) has a straight alignment and has, on the jacket, a plurality of spring holders (14), into each of which a spring element (13) is inserted. The spring holders (14) may be designed as trough-like indentations and accommodate, e.g., an elastic cord with a circular cross section. The spring elements (13) are in contact with the wall of the outer axle tube (10) on the outside. FIG. 5 shows this embodiment. The cross-sectional shape of inner axle part (11) may be, e.g., essentially triangular and may be used for accommodating three spring elements (13) distributed uniformly on the circumference.

The inner axle part (11) may be hollow and be designed as a tube. The rocker arm (12) may have a tubular shape as well. In the exemplary embodiments, the rocker arm assembly (6) is designed as an angular tube (22). The tube (22) has, e.g., an L shape with a curvature or angular deflection (16) at the transition point between the inner axle part (11) and the rocker arm (12). The bending angle α may be, e.g., 90°.

The cross-sectional shape of the tube (22) may vary. It is triangular in the area of the inner axle part (11) and has at least three indentations (14) in certain areas. It may also be triangular in the area of the rocker arm (12). In the area of the bending or curvature (16), a different shaping may be present in some places. Otherwise, the tube (22) may also have other cross-sectional shapes, e.g., circular, oval or another prism shape. The cross-sectional geometry may vary over the length of the tube.

In the area of the bending or curvature (16), the tube (22) may have a reinforcement (17). This may have, e.g., a bead-shaped design and enlarge the tube cross section, whereby the tube wall (24) is correspondingly bulged out. The larger cross section reinforces the rocker arm assembly (6) in the curvature and bending area.

The axle stub (8) may be arranged and fastened with a transverse alignment at the free end of the rocker arm (12). For this, the rocker arm (12) may have a recess (18) on the tube wall (24), which is designed, e.g., as a semicircular double shell and accommodates and guides the cylindrical axle stub (8), whereby the fixing can be done by means of welding or in another suitable manner.

The inner axle part (11) may protrude with a projection (15) from the outer axle tube (10), whereby the rocker arm (12) and the curvature (16) are correspondingly distanced from the tube end.

Figure 11:
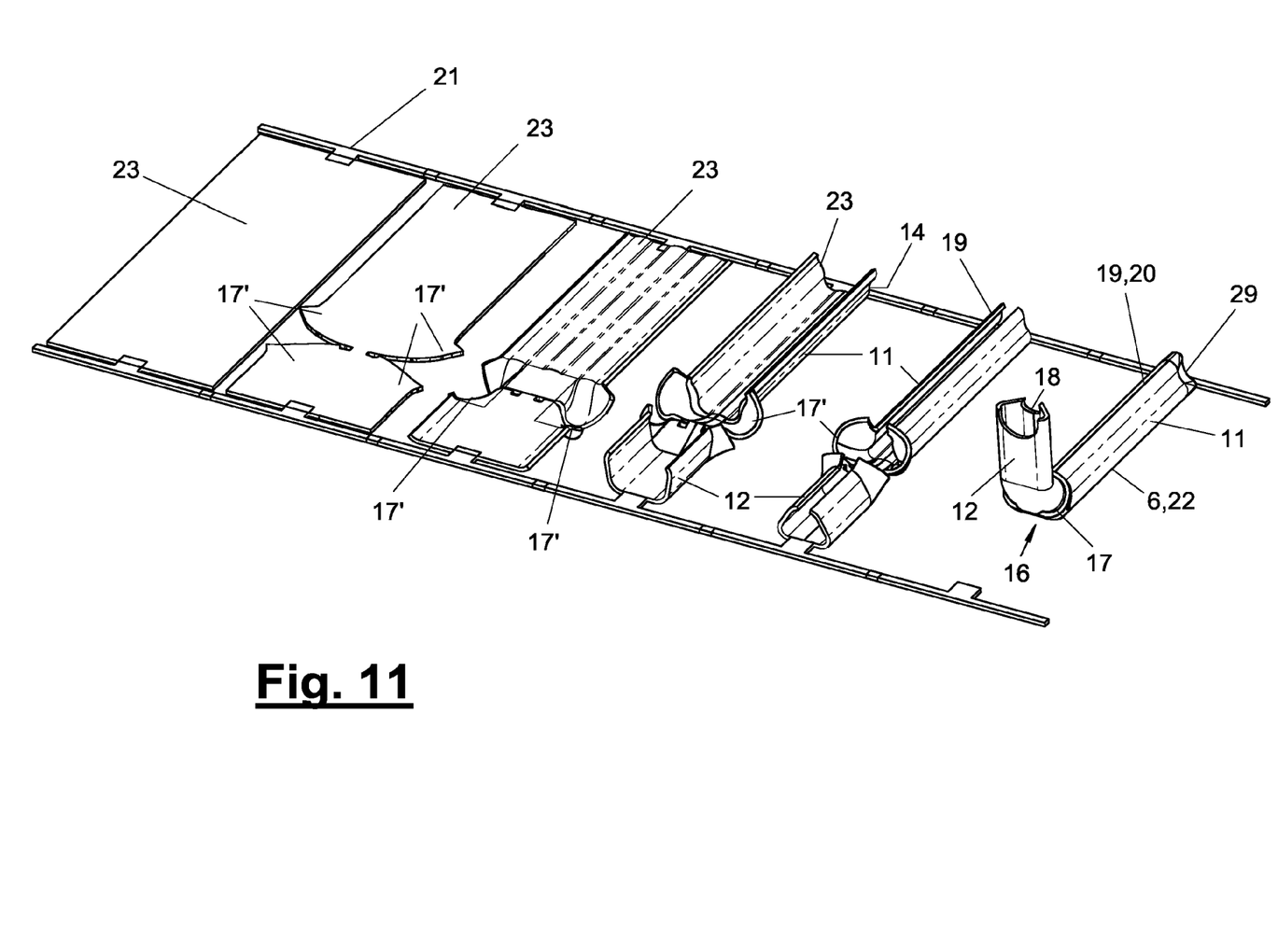
FIG. 11 is a perspective view of a stamping billet and the production steps for forming a rocker arm assembly.

The rocker arm assembly (6) is designed as a one-piece stamped and bent part made of metal, e.g., steel, and is produced, e.g., from a single sheet metal strip (23). FIG. 11 shows a stamping billet (21) for this and the sequence of several stamping and bending steps, which are carried out with a corresponding follow-on tool (not shown).

At first, a flat sheet metal strip (23) is cut free from the flat billet (21) up to two end-side holding lugs, which sheet metal strip (23) is then shaped by one or more other stamping steps and, moreover, deformed by embossing and bending. During the stamping, e.g., wings (17') are cut free for later forming of the bead (17) and the recess (18).

In the next production steps, the indentations (14) and the bead (17) can be formed with a bending and embossing tool, and the sheet metal strip (23) can be bent over for forming the hollow and, e.g., triangular tube shape. The wings (17') are arched in a bulge-like manner and bent over for forming the bead. The lead-in bevel (29) may be embossed as well. The axle part (11) and the rocker arm (12) are formed with the above-mentioned production steps with a first flush alignment, whereby in the last step shown in FIG. 11, the rocker arm (12) is bent over by approximately 90° opposite the inner axle part (11). The edges of the sheet metal strip collide approximately in the lengthwise running central line of the now formed tube (22) and form abutting edges (19), which can then be connected with a joint (20). This may be done, e.g., by means of welding or in another suitable manner. Abutting or connecting edges (19), which collide after the bending of the tube and which are sealed with a joint (20), also form on the bulged-out oval bead edges. The junction (19) in the bending area (16) and at the bead (17) is designed, e.g., as a lap joint, whereby the joint or weld seam (20) is embodied as a fillet weld. This is favorable for a reliable welding. As an alternative, a butt joint (19) is also possible.

The bent tube (22) obtains a sealed jacket (24) by means of the junction (19) and the joint or weld seam (20). Before and after the joining, the tube (22) is separated from the billet residues and then further processed and mounted.

FIGS. 7 through 10 show the above-described tube geometry with the right and left rocker arm assembly (6), which may have essentially the same design. The essentially oval shape of the bead (17) is evident from FIG. 8. The oval shape of the bead (17) and the cross section enlarged by the bead (17) are advantageous for reasons of stability, since the strength may be weakened in this area by the weld seam (20). The preferably ideal oval cross-sectional shape in the connection area of the inner tube (11) and the rocker arm (12) is advantageous for transmitting the resulting forces and for minimizing the weld seam stresses.

Figures 7, 8:
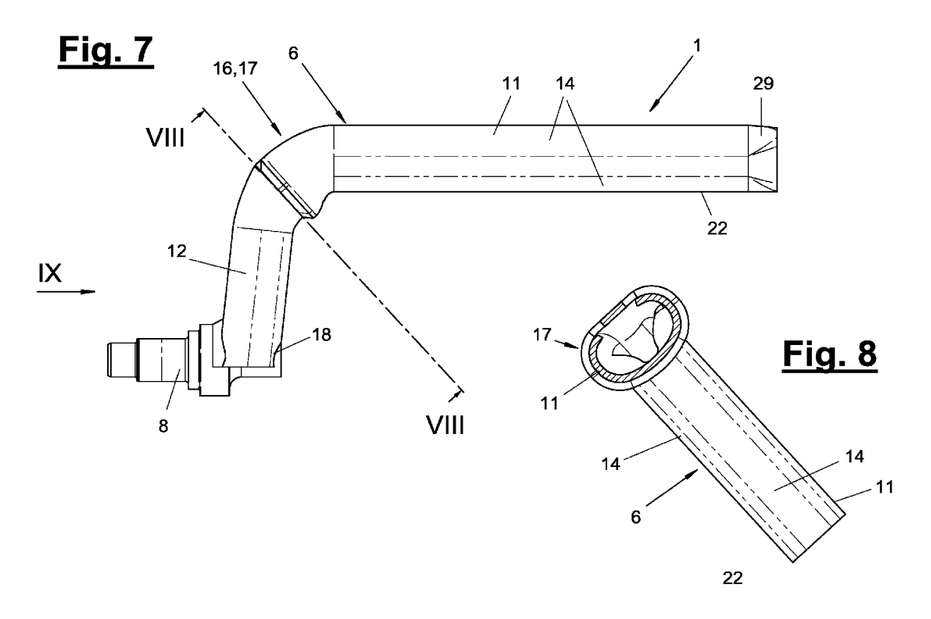
FIG. 7 is a front view of a rocker arm assembly.
FIG. 8 is a sectional view according to intersecting line VIII-VIII of FIG. 7.
Figures 9, 10:
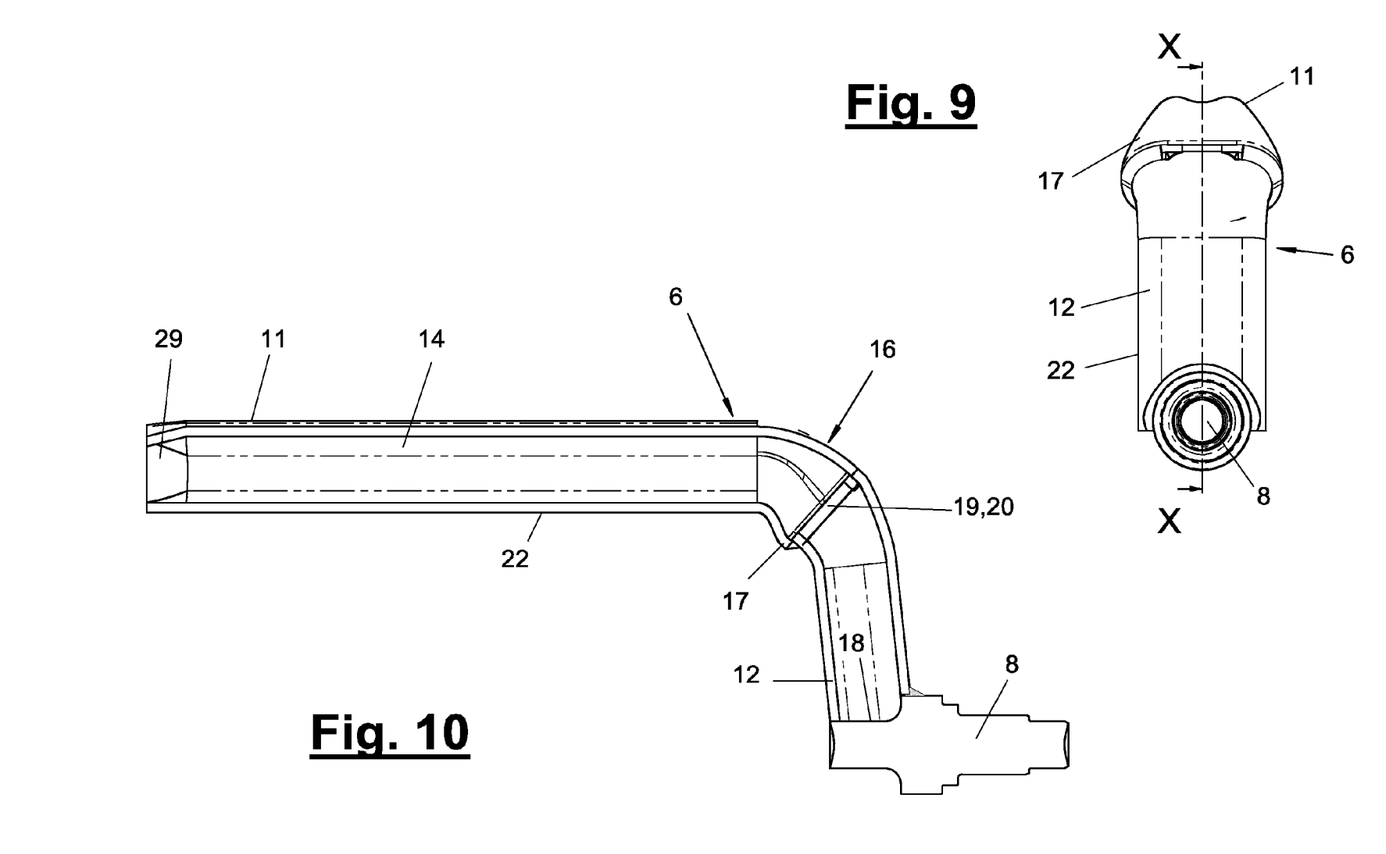
FIG. 9 is a front view of the rocker arm assembly according to arrow IX of FIG. 7.
FIG. 10 is a sectional view through the rocker arm assembly according to intersecting line X-X of FIG. 9.
Figure 19:
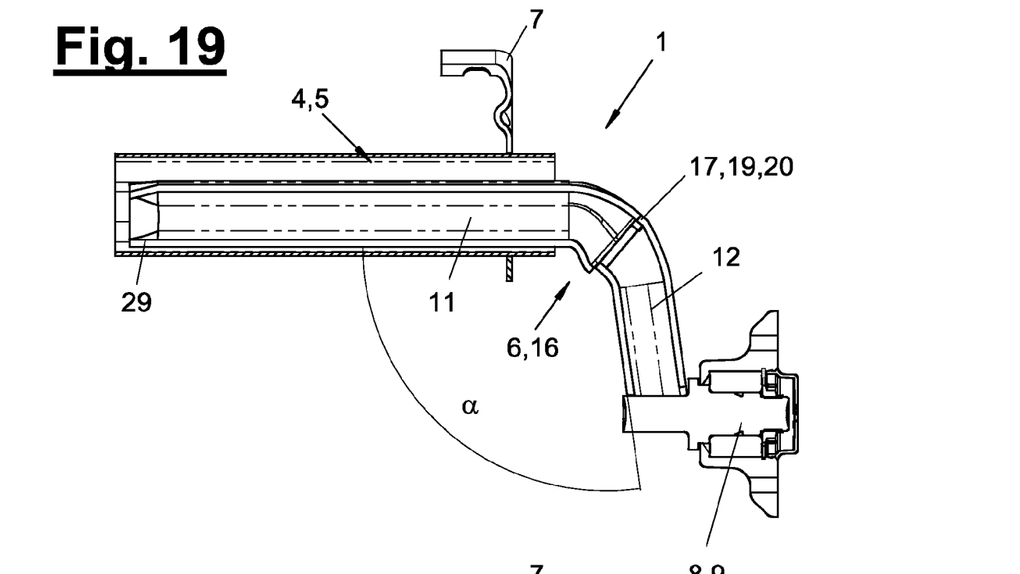
FIG. 19 is cut front view of a rocker arm assembly with wheel brake and at one of different bending angles.
Figure 20:
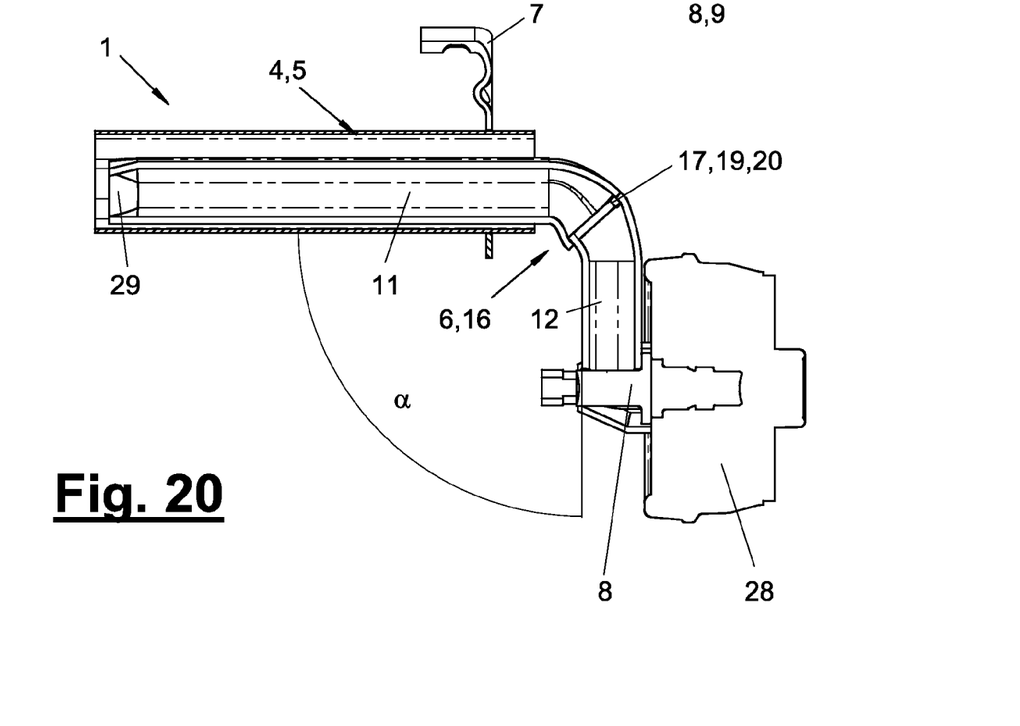
FIG. 20 is a cut front view of a rocker arm assembly without wheel brake and at another of different bending angles.

The recesses (18) of varying sizes for accommodating axle stub sections of varying sizes are shown in FIGS. 7 and 10. Moreover, it is evident from FIGS. 7, 10, 19 and 20 that the bending angle α between the inner axle part (11) and rocker arm (12) is somewhat greater than 90° and, e.g., approximately 95°. Preferably, bending angle α is between 90° and 100°, but may also have other values. FIGS. 19 and 20 will be dealt with below.

Figures 12, 13:
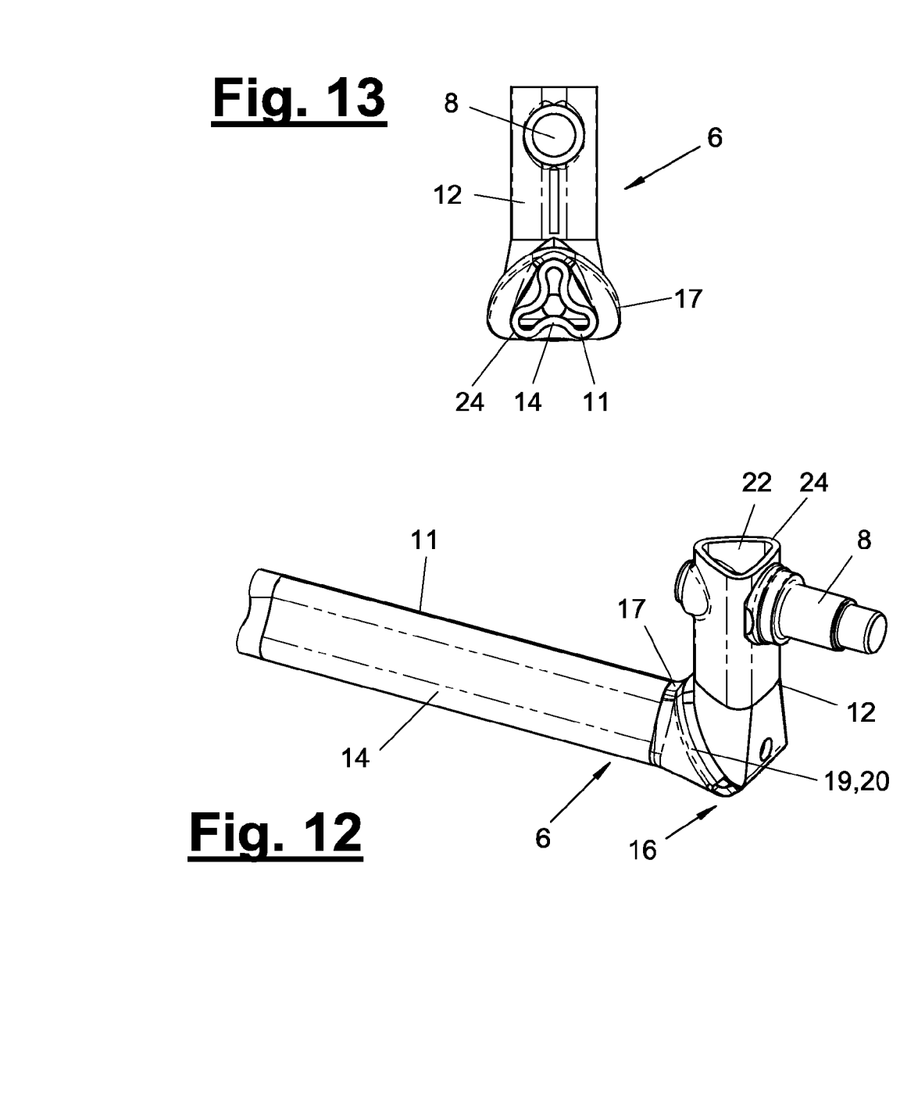
FIG. 12 is a variant of the rocker arm assembly in a perspective view.
FIG. 13 is a variant of the rocker arm assembly in a front view.

FIGS. 12 and 13 illustrate a first variant of the rocker arm assembly (6) and of the tube (22). The tube cross section may also be prismatic and, e.g., essentially triangular here again as in the first exemplary embodiment. The tube wall or jacket (24) may also have abutting edges (19) and joints (20), which may be running lengthwise over the course of the straight tube sections (11, 12) and endlessly running transversely in the area of the bending or curvature (16), in this exemplary embodiment. The bending angle α of the curvature (16) is 90° in this exemplary embodiment. The axle stub (8) is inserted transversely through the tube end of the rocker arm (12) in this variant, and the tube end has corresponding openings with bulges for accommodating the stub.

Figure 14:
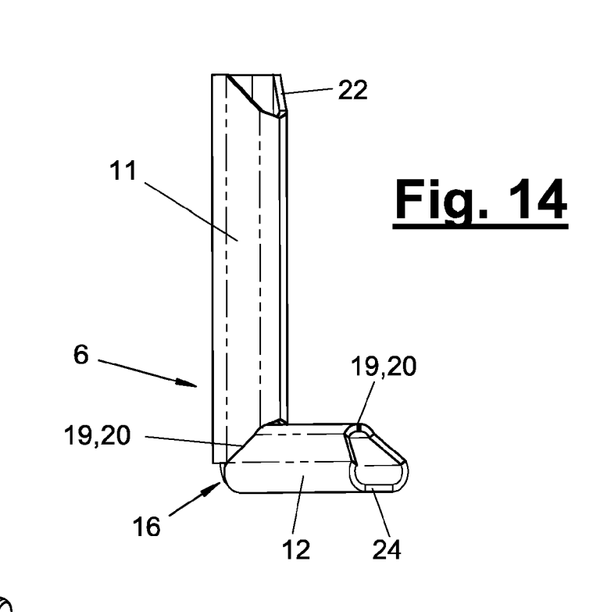
FIG. 14 is a perspective view of another variant of the rocker arm assembly.

FIG. 14 discloses a second variant of the rocker arm assembly (6), which has a similar design as in the above-described exemplary embodiment of FIGS. 1 through 11, whereby the tube (22) is missing the bead-like reinforcement (17) in the bending area in this variant. Here, the edges of the tube sections (11, 12), which have a triangular cross section, are connected with a joint (20) at the abutting edges (19). Furthermore, abutting edges (19) running lengthwise and joints (20) are also present at the straight tube sections.

Figure 15:
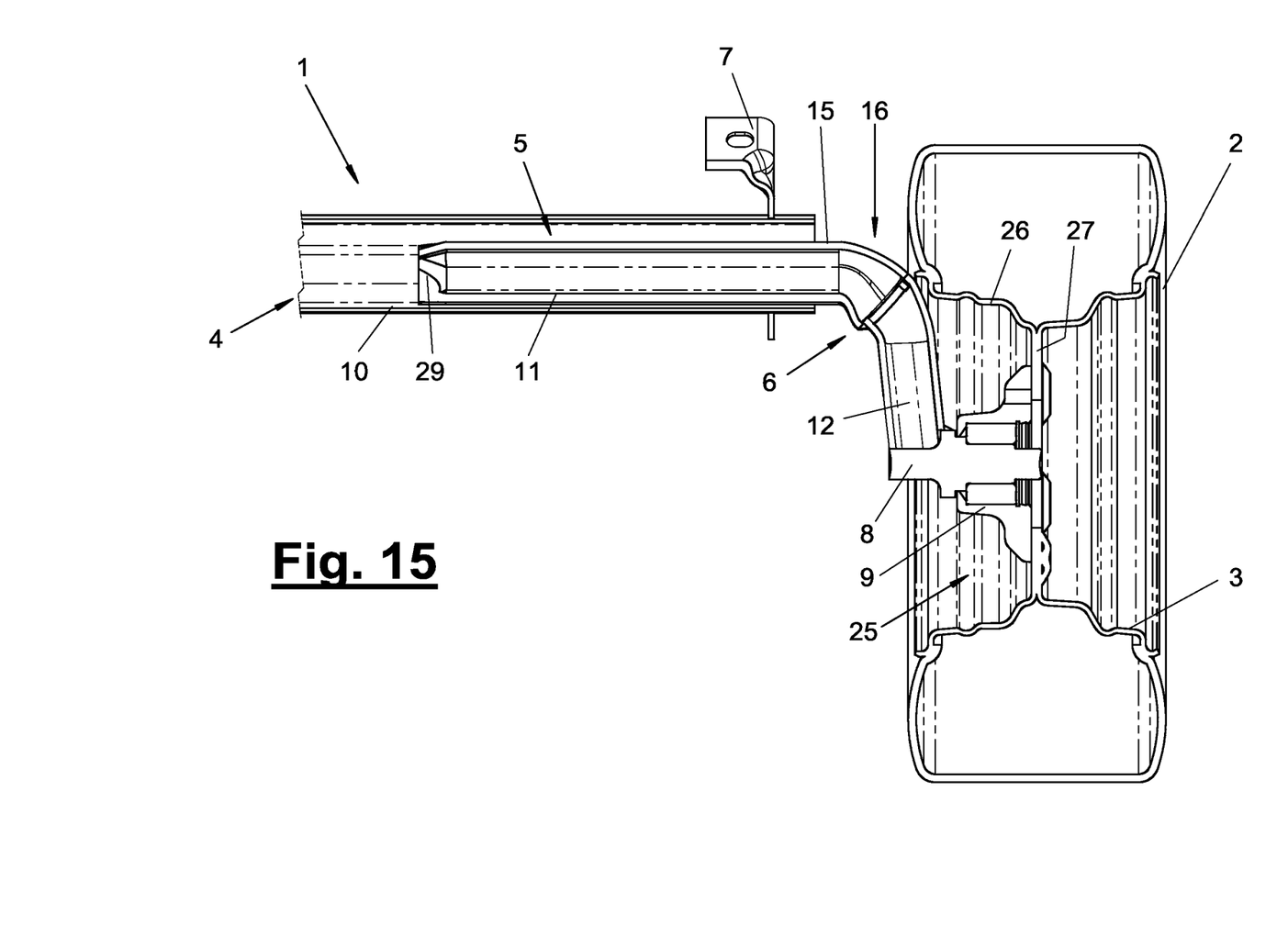
FIG. 15 is a broken-off view of an axle with a rocker arm assembly and a wheel with a rim.
Figure 16:
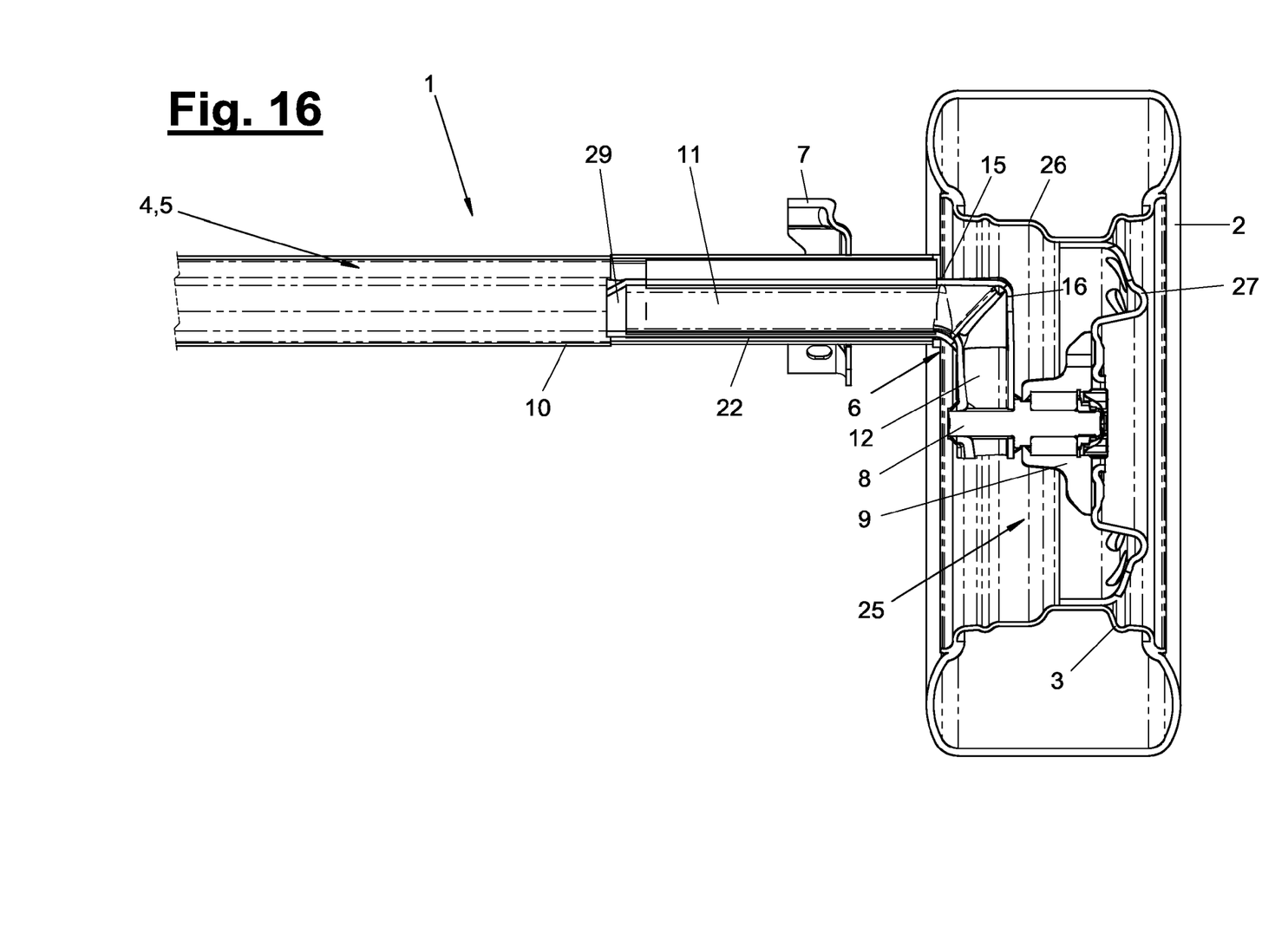
FIG. 16 is a partly cut side view of an axle with a rocker arm assembly and a wheel with a rim.
Figure 17:
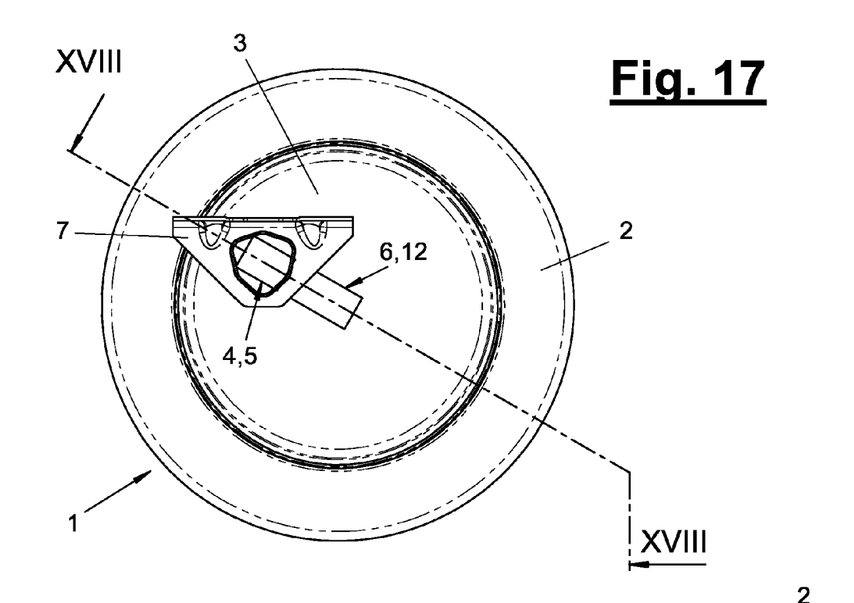
FIG. 17 is a variant of the rocker arm assembly with a wheel brake in side view.
Figure 18:
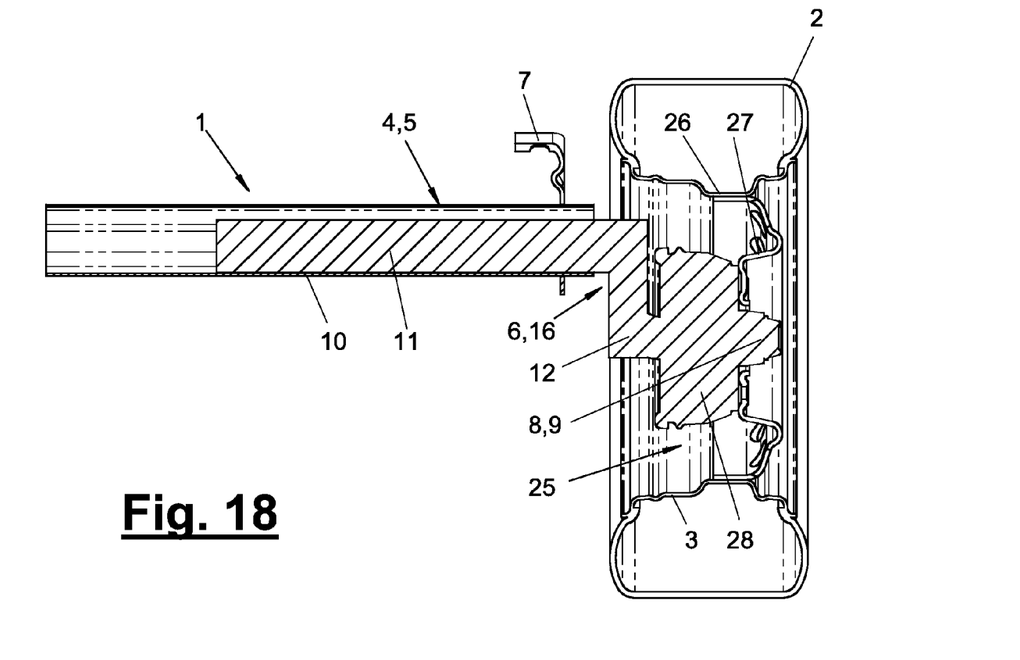
FIG. 18 is a variant of the rocker arm assembly with a wheel brake in a sectional view along line XVIII-XVIII.

FIGS. 15 through 18 show various variants of a wheel bearing and the relationship of the rocker arm assembly (6) to the wheel (2). In all variants, the wheel (2) consists of a rim (3) and a tire. The rim (3) has a base or a circumferential rim ring (26) and a rim disk (27), which is also referred to as wheel rim and to which the hub (9) is fastened with screws or the like. FIGS. 17 and 18 show the additional arrangement of a wheel brake (28), e.g., a drum brake, in the hub area. As an alternative, it may be a disk brake or a different type of brake. A wheel brake is absent in the variants of FIGS. 15 and 16. In variation to the embodiments shown, a wheel brake may also be present in FIGS. 15 and 16.

In the representation of FIG. 15, the rocker arm assembly (6) corresponds to the above-described embodiment of FIGS. 1 through 11. The rocker arm (12), which is bent by more than 90°, is largely located outside the rim interior space (25) formed between rim ring (26) and rim disk (27), whereby essentially only the axle stub (8) and the hubs (9) protrude into the latter. The curvature or bending (16) is slightly rounded in this embodiment of the rocker arm assembly (6). Moreover, a projection (15) is present, about which the straight inner axle part (11) protrudes from the outer axle tube (10). As FIGS. 1 through 6 illustrate, the rocker arm assembly (6) of the rocker arm (12) is oriented diagonally downwards in this variant.

In the variant of FIG. 16, the rocker arm (12) is located essentially within said rim interior space (25). The rocker arm (12) has a shortened length for this. Moreover, the bending angle α of the curvature (16) may be smaller and may be, e.g., 90°. As FIG. 16 shows, the straight part of the rocker arm lies completely within the rim interior space (25).

The end of outer axle tube (10) protrudes up to the wheel (2) and may even reach a little bit beyond the tire circumference to the rim (3). The projection (15) is shortened or possibly absent. Also, the bending and curvature area of the rocker arm assembly (6) may be located completely in the rim interior space (25) formed by the rim ring (26) and the rim disk (27). Similar to FIGS. 1 through 16, the rocker arm (12) is oriented diagonally downwards. The structural design of the rocker arm assembly (6) may correspond to that of the variants of FIGS. 12 and 13.

As a variant of the embodiment shown, the rocker arm assembly (16) of FIGS. 1 through 11 and 15 may also be varied, whereby the rocker arm (12) protrudes into said rim interior space (25) and is essentially accommodated here. For this, the rocker arm (12) may be shortened and the bending or curvature (16) may possibly be changed.

As a comparison of FIGS. 15 and 16 shows, with the accommodation of the rocker arm (12) in the rim interior space (25), the lateral distance of the wheel (2) from the side contour of the vehicle, and especially from the side wall of the structure or from the adjacent side rail of the chassis, is reduced. Correspondingly, the track width of the vehicle becomes smaller. On the other hand, the reduction in distance may also be used to increase the usable vehicle width of the structure in case of a given track width. Moreover, the accommodation of the rocker arm (12) in the rim interior space (25) makes possible the lowering of the height of the axle body (4) and of the vehicle. The axle design of FIG. 16 and accommodation of the rocker arm (12) in the rim interior space (25) has independent inventive importance and may also be used in other types of rocker arm assemblies (6). These may be designed, e.g., corresponding to the state of the art mentioned in the introduction and may be one piece. The rocker arm assembly (6) may have a multipiece design and may be especially designed as a welded part. It may also be designed as a solid cast part similar to that shown in FIGS. 17 and 18. In a multipiece rocker arm assembly (6), a junction or connecting point between rocker arm (12) and inner axle part (11) may be located in the rim interior space (25).

In the variants of FIGS. 15 through 18 shown, the rocker arm (12) is located for the most part or completely in the rim interior space (25). The bending or curvature area of the rocker arm assembly (6) may also be arranged for the most part or completely in the rim interior space (25). The rim ring (26) overlaps the rocker arm (12) and the bending and curvature area with its free edge.

FIGS. 19 and 20 illustrate the circumstance that the bending angle α between the inner axle part (11) and the rocker arm (12) may change depending on whether a wheel brake (28) is present or not. A change may be based on other reasons as well. Since a wheel brake (28) in the rim interior space (25) takes up more space, as this can also be seen in FIG. 18, the bending angle α may be small accordingly and may be, e.g., 90°. In a plain carrying axle without wheel brake, the bending angle α may be greater and may be, e.g., approximately 100° according to FIG. 19.

FIGS. 19 and 20 illustrate, moreover, that the different bending angles α can be achieved due to a change in the junction point (19) and the weld seam (20) at the bead (17). The embossed part and its production according to FIG. 11 may be identical here. The change in angle may be achieved in a welding device. In this case, the degree of overlapping of the profile edges at the junction point (19) is varied, which can be achieved, e.g., by different tensioning. Hereby, an overlapping of the sheet metal edges at the junction point (19) and a fillet welding (20) are in turn advantageous.

In a variant not shown, it is possible to always provide identical bending angles α for carrying axles and braked axles for a uniform shape of the rocker arm assembly (6) and to achieve a balance for the installation dimension of the rim (3) via a correspondingly lengthened axle stub (8). This may lead to an increase in weight. The above-described assembly with varying overlapping dimensions at the junction point (19) makes it possible to leave the weight of the rocker arm assembly (6) unchanged.

Various deviations of the embodiments shown and described are possible. In particular, the features of the exemplary embodiments can be interchanged or be combined with one another. Variants are especially possible in terms of the cross-sectional forming of the tube (22), the bending angle α, the formation of the bending or curvature (16), the reinforcement (17) and the connection with an axle stub (8). The spring mounting (5) may be designed differently and may be, e.g., a torsion bar spring mounting. An integrated axle spring mounting (5) may be dispensed with in favor of an external spring mount, whereby inner axle part (11) has a correspondingly different shape and is mounted in the outer axle tube (10) in a suitable manner. In such an embodiment, the rocker arm assembly (6) may also be designed as a stamped and bent part made of metal. Furthermore, variants are possible in the bending and stamping method for producing a preferably one-piece, possibly also multipiece tubular rocker arm assembly (6). The sequence of stamping and bending steps shown in FIG. 11 may be varied by steps being switched or additional steps being added. The lead-in bevel (29) may be embossed, e.g., before the bending of the L shape of the tube (22). In the embodiment of FIG. 11 shown, the sequence of stamping and bending steps with the mentioned follow-on tool, which is also referred to as a composite follow-on tool, may be carried out in an automatic stamping unit. As an alternative, a transfer tool may be used, whereby individual sheet metal pieces are first separated in a separating station from the, e.g., strip-like or panel-like billet (21) and the separated individual parts are then transported by means of grippers in a transfer means coupled to the press or bending means from work step to work step. In a further variant, the sheet metal part can be cut by another cutting method, e.g., by means of laser cutting, flame cutting or the like. Hereby, contoured sheet metal strips (23) may also be formed separately or in a cohesive composite and then be bent in one or more work steps, possibly while using an aforesaid transfer means. In all said embodiments, the tube (22) may be generally produced as a cut and bent part from a strip- or panel-like metal sheet or such a billet.

While specific embodiments of the invention have been shown and described in detail to illustrate the application of the principles of the invention, it will be understood that the invention may be embodied otherwise without departing from such principles.

The invention claimed is:

1. A carrying axle for vehicles and trailers, the axle comprising an axle body comprising:
an outer supporting tubular axle part; and
an angular rocker arm assembly mounted within the tubular axle part, the angular rocker arm assembly including at least one bend, the rocker arm assembly comprising a one-piece, tubular, stamped and bent part made of metal, the one-piece bent part defining an inner axle portion with a length, a rocker arm portion and a curved portion connecting the inner axle portion to the rocker arm portion, and the rocker arm assembly further comprising a lengthwise single weld seam extending along the length of the inner axle portion and joining edges of the one-piece bent part, the one-piece bent part and the lengthwise single weld seam exclusively forming a jacket of inner axle portion along the length of the inner axle portion.

2. An axle in accordance with claim 1, further comprising an axle spring mounting integrated in the tubular axle part.

3. An axle in accordance with claim 1, further comprising a cord-shaped spring element; wherein the inner axle portion comprises an axle tube defining a spring holder for holding the cord-shaped spring element.

4. An axle in accordance with claim 1, further comprising an axle stub wherein the axle stub projects transversely from the rocker arm portion at an end thereof.

5. An axle in accordance with claim 1, wherein a bending angle of the tube of the rocker arm assembly is between 90° and 100° at the curved portion between the inner axle portion and the rocker arm portion.

6. An axle in accordance with claim 1, wherein the axle has a wheel with a rim, whereby the rocker arm assembly is coordinated with the rim such that the rocker arm portion is mostly arranged in a rim interior space.

7. An axle in accordance with claim 1, wherein the rocker arm assembly one-piece bent part is comprised of a single sheet metal strip which has been stamped and bent into an angular tube.

8. An axle in accordance with claim 7, wherein the angular tube of the rocker arm assembly has a triangular cross section.

9. An axle in accordance with claim 7, wherein the rocker arm assembly has tube wall abutting edges with a weld seam joint.

10. An axle in accordance with claim 9, wherein the angular tube has an end with an abutting edge.

11. An axle in accordance with claim 1, wherein the inner axle portion part and the rocker arm portion are connected transversely or diagonally.

12. An axle in accordance with claim 11, wherein the rocker arm assembly has a bead reinforcement area at the curved portion between the inner axle portion and the rocker arm portion.

13. An axle in accordance with claim 12, wherein an abutting edge runs in an area of the curved portion.

14. An axle in accordance with claim 12, wherein the rocker arm assembly has a lap joint with a fillet weld at the curved portion.

15. An axle in accordance with claim 14, wherein a wall of the tubular axle part in the bead reinforcement area has an enlarged cross section at the curved portion.

16. An axle in accordance with claim 14, wherein a wall of the tubular axle part in the bead reinforcement area has an oval cross section at the curved portion.

17. A method for producing a carrying axle for vehicles and trailers, the method comprises the steps of:
providing an axle body with an outer supporting tubular axle part;
producing an angular rocker arm assembly, that has a bend, as a one-piece, tubular, stamped and bent part made of metal, the one-piece bent part being shaped to define an inner axle portion with a length, a rocker arm portion and a curved portion connecting the inner axle portion to the rocker arm portion, and the rocker arm assembly further comprising a lengthwise single weld seam extending along the length of the inner axle portion and joining edges of the one-piece bent part, the one-piece bent part and the lengthwise single weld seam exclusively forming a jacket of the inner axle portion along the length of the inner axle portion; and
mounting the angular rocker arm assembly in the axle part.

18. A method in accordance with claim 17, wherein the rocker arm assembly is stamped from a sheet metal strip and is bent into an angular tube.

19. A method in accordance with claim 17, wherein said step of producing the rocker arm assembly includes forming the inner axle portion and the rocker arm portion connected transversely or diagonally thereto via the curved portion.

20. A method in accordance with claim 19, further comprising providing an axle stub, wherein at a free end of the rocker arm portion of the rocker arm assembly, a recess is formed and the axle stub is inserted and fixed with the recess.

21. A method in accordance with claim 18, wherein the sheet metal strip has edges that form abutting edges, which are connected with the lengthwise single weld seam, the lengthwise single weld seam being along a lengthwise running central line of the angular tube.

22. A method in accordance with claim 21, wherein the abutting edges contact upon a bending of the tube and are sealed with the lengthwise single weld seam and are formed at bulged, oval edges of a bead.

23. A method in accordance with claim 22, wherein a junction in a bending area and at the bead comprises a lap joint with a fillet weld.

24. A carrying axle for vehicles and trailers, the axle comprising an axle body comprising:
an outer supporting tubular axle part; and
an angular rocker arm assembly mounted within the tubular axle part, the angular rocker arm assembly comprising a one-piece, tubular, stamped and bent part made of metal, the one-piece bent part defining an inner axle portion having a length, a rocker arm portion having a length and a curved portion connecting the inner axle portion to the rocker arm portion, such that the rocker arm portion extends in a lengthwise direction at an angle relative to a lengthwise direction of the inner axle portion; and the rocker arm assembly further comprising:
a lengthwise single inner axle portion weld seam extending along the length of the inner axle portion and joining edges of the one-piece bent part, the one-piece bent part and the lengthwise single inner axle portion weld seam exclusively forming a jacket of the inner axle portion along the length of the inner axle portion and the lengthwise single inner axle portion weld seam extending approximately along a lengthwise running central line of a formed inner axle portion tube; and
a lengthwise single rocker arm portion weld seam extending along the length of the rocker arm portion and joining edges of the one-piece bent part, the one-piece bent part and the lengthwise single rocker arm portion weld seam exclusively forming a jacket of the rocker arm portion along the length of the rocker arm portion and the lengthwise single rocker arm portion weld seam extending approximately along a lengthwise running central line of a formed rocker arm portion tube.

* * * * *